Aug. 2, 1938.  P. V. ANDERSON  2,125,763
COASTING AND DRIVING HUB
Filed Jan. 25, 1937
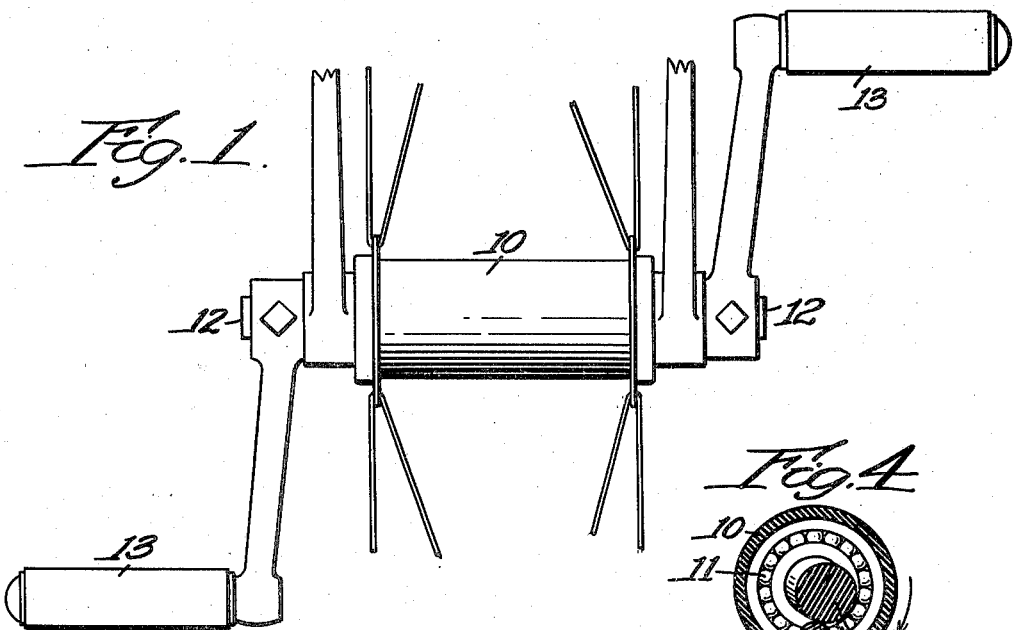
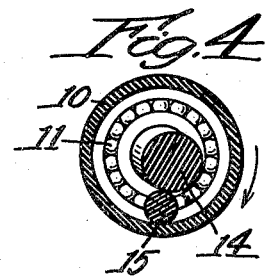
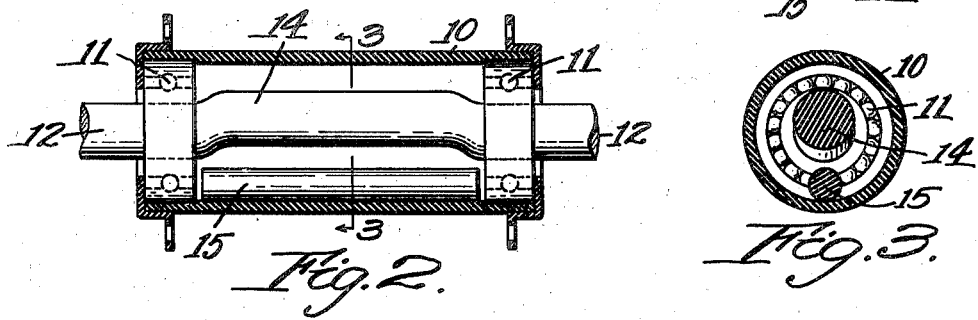
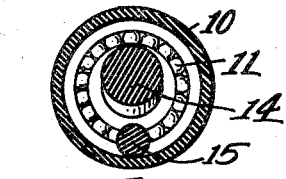
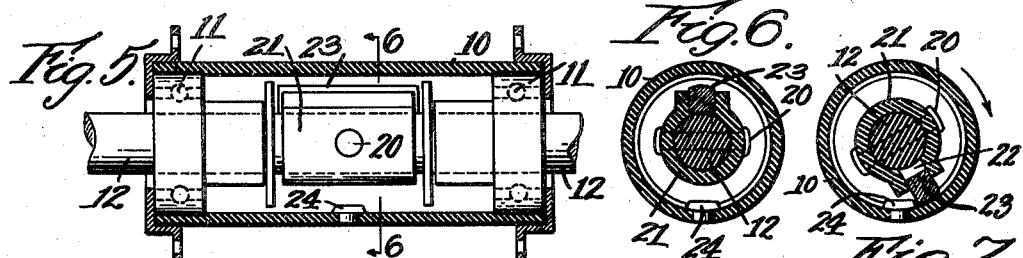
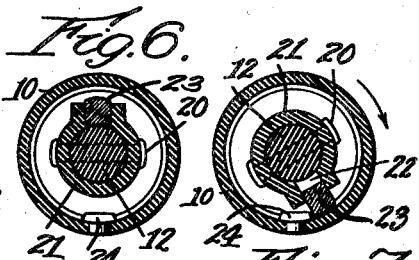
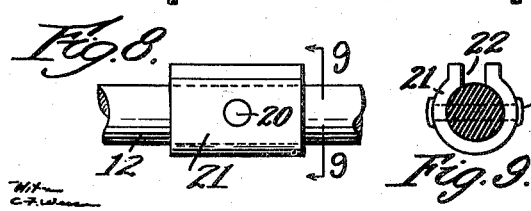
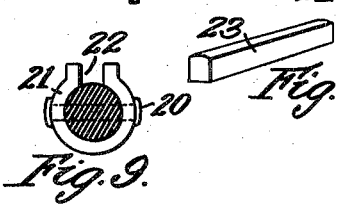
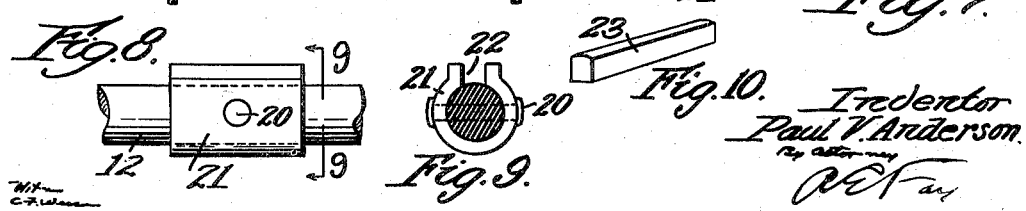

Patented Aug. 2, 1938

2,125,763

UNITED STATES PATENT OFFICE 2,125,763

COASTING AND DRIVING HUB

Paul V. Anderson, Gardner, Mass., assignor to Gardner Tool and Stamping Company, Gardner, Mass., a partnership consisting of Paul V. Anderson, Gardner, Mass., and William Le Clair and Henry F. Greene, both of East Templeton, Mass.

Application January 25, 1937, Serial No. 122,327

3 Claims. (Cl. 192—64)

This invention relates to a wheel hub suitable for use on the front wheel of a velocipede, pedal car, or the like, for children's use but capable of being used on full sized pedal operated vehicles.

The principal objects of the invention are to provide a very simple construction, having a minimum number of parts, adapted to be easily assembled which will permit pedaling either in a forward or backward direction and without any action on behalf of the operator and allowing coasting either forward or backward.

More specifically stated, the invention involves gravity operated means, whereby, when the axle is held stationary in a certain position, the wheel with its hub can coast freely in either direction, as stated above, and yet the wheel and hub can be turned in either direction without hindrance.

Other objects and advantages of the invention will appear hereinafter.

Reference is to be had to the accompanying drawing, in which

Fig. 1 is a front view of a velocipede wheel with the axle and pedals applied thereto and constructed in accordance with a preferred embodiment of this invention;

Fig. 2 is a longitudinal sectional view taken through the center of the hub and associated parts;

Fig. 3 is a sectional view on the line 3—3 of Fig. 2;

Fig. 4 is a similar sectional view showing the parts in a different position;

Fig. 5 is a view similar to Fig. 2 showing a modified form of the invention;

Fig. 6 is a sectional view on the line 6—6 of Fig. 5;

Fig. 7 is a similar sectional view showing the parts in a different position;

Fig. 8 is an elevation of a part of the axle and an operating device mounted thereon;

Fig. 9 is a sectional view on the line 9—9 of Fig. 8, and

Fig. 10 is a perspective view of a loose piece used in this form of the invention and adapted to be operated by gravity.

The invention is shown as applied to the front wheel of a child's velocipede. This wheel, as usual, is provided with a cylindrical hollow hub 10 and anti-friction bearings 11 at both ends to support the axle 12. This axle is provided, as usual, with pedals 13.

In the form shown in Figs. 1 to 4 the part 14 of the axle inside the hub is made eccentric and a freely rotatable longitudinal cylindrical roller 15 is located loosely within this hub. The axle is of such diameter that when the eccentric portion 14 is turned toward it, it will grip the hub between that portion and the inside of the hub and cause a clutching action to turn the hub with the axle. This part is so constructed that it works in both directions, that is, the wheel can be turned either backwardly or forwardly by the pedals without any trouble or manipulation by the operator other than reversing the direction in which he pedals. This is of particular advantage in children's vehicles of this general type because they wish to go backward and forward. Furthermore, in many kinds of these vehicles, the front wheel can turn all the way around on a nearly vertical axis with its fork. This constitutes a very simple arrangement for the purpose of pedaling.

When it is desired to coast, the child holds the pedals stationary with the left one as shown in Fig. 1 at the bottom so as to leave the eccentric portion 14 at the top, as shown in Figs. 2 and 3. In this case the roller 15 is left entirely free and the hub also is free so that the vehicle can coast in either direction forward or back.

It will be seen that the roller 15, being cylindrical, will naturally roll to the bottom of the hub by the action of gravity and keep out of the way of the eccentric portion 14 when that is in the position shown in Figs. 2 and 3. Likewise the roller 15 will come to the bottom when the child is pedaling and the eccentric portion 14 will come into contact with it no matter which way the axle is rotated to drive the vehicle in either direction. After this, in pedaling, the roller 15 moves around the circle with the eccentric 14.

Similar results are obtained by the form shown in Figs. 5 to 10 inclusive. In this case the axle is provided with a diametrical pin 20 which holds in stationary position on the axle a yoke 21 having a radial space 22 between its ends. This space is always in the same position on the axle. In this space is located a bar 23 which is not confined in any way except that the distance from it to the inside of the hub is so short that the bar cannot be displaced. It simply moves by gravity from the position indicated in Fig. 6 to that indicated in Fig. 7. In the position shown in Fig. 6 the hub is free to turn in either direction and consequently this is the coasting position. The vehicle can coast either forward or back. All the operator has to do is to turn the axle to the right position by holding his left pedal down, a very simple operation to learn.

When it is desired to pedal the vehicle, the pedals are turned in the right direction and, before a revolution is completed, the bar 23 will come to a downwardly extending position in the slide 22 and will engage a stop stud 24 secured to the hub and extending inside, as shown in Fig. 7. Therefore, this form of the invention secures the same results as the other and the getting of the parts in position for pedaling is performed by the action of gravity in both cases. It is also true in both cases that the axle has to be held in a certain definite position for coasting in either case.

In addition to the fact that very few parts are required to enable the above mentioned actions to be performed, they are easily assembled and have nothing that is likely to get out of order or to become inoperative on account of gathering dust and the like. The entrance of dust would not affect the form shown in Figs. 1 to 4 at all and would not be likely to have any effect on the other form because protected by the bearings 11.

Having thus described my invention and the advantages thereof, I do not wish to be limited to the details herein disclosed, otherwise than as set forth in the claims, but what I claim is:

1. In a device of the character described, the combination with a wheel hub having a cylindrical inside surface, of an axle for supporting pedals on its ends, said axle having an eccentric portion entirely in the form of an offset complete circle from end to end of the hub, and a roller inside the hub of such size as to be engaged by the outside of the eccentric part of the axle and pressed by the rotation thereof against the inside of the hub at the bottom thereof, irrespective of the direction of rotation, to clutch the hub and cause it to rotate with the axle, said roller being set free of the axle when the axle is turned backwardly so that the eccentric portion extends away from the roller to allow the hub and the wheel carried thereby to coast in either direction.

2. The combination with a hollow wheel hub, of an axle extending therethrough and having a projecting portion on one side and a roller loose in the hub, the diameter of the roller plus the radius of said projecting portion being greater than the inside radius of the hub.

3. In a device of the character described, the combination with a hollow wheel hub and an axle extending therethrough, said axle having an eccentric portion, of a roller inside the hub rotatable all around the circle, engaging the inside surface of the hub and adapted to be engaged by the eccentric portion of the axle when the axle is turned to a certain position in either direction, for transmitting the rotation of the axle to the hub either forward or backward in accordance with the direction of rotation of the axle, and means whereby the roller remains free and inoperative when the axle is held against rotation, with the eccentric portion of the axle out of contact with the roller, whereby coasting either forward or backward is permitted whenever the axle is not turning.

PAUL V. ANDERSON.